United States Patent [19]

Geise et al.

[11] Patent Number: 5,247,520
[45] Date of Patent: Sep. 21, 1993

[54] COMMUNICATIONS ARCHITECTURE INTERFACE

[75] Inventors: David M. Geise; Thomas F. Pebbles; Roger K. Richter, all of Austin, Tex.

[73] Assignee: International Business Machines Corporation, Armonk, N.Y.

[21] Appl. No.: 421,483

[22] Filed: Oct. 13, 1989

[51] Int. Cl.$^5$ ............................ G06F 13/00; H04J 3/24
[52] U.S. Cl. ................................ 370/94.1; 370/85.13; 395/500; 395/800
[58] Field of Search .................... 370/54, 60, 60.1, 61, 370/85.1, 85.9, 85.13, 94.1; 340/825.5, 825.51, 825.52; 395/500, 800

[56] References Cited

U.S. PATENT DOCUMENTS

| | | | |
|---|---|---|---|
| 4,677,588 | 6/1987 | Benjamin et al. | 364/900 |
| 4,703,475 | 10/1987 | Dretzka et al. | 370/60 |
| 4,884,263 | 11/1989 | Suzuki | 370/60 |
| 4,894,822 | 1/1990 | Buhrke et al. | 370/60 |
| 4,933,937 | 6/1990 | Konishi | 370/94.1 |
| 4,941,089 | 7/1990 | Fischer | 370/94.1 |
| 5,025,491 | 6/1991 | Tsuchiya et al. | 370/94.1 |
| 5,027,350 | 6/1991 | Marshall | 370/85.13 |
| 5,095,480 | 3/1992 | Fenner | 370/94.1 |

OTHER PUBLICATIONS

Alfred V. Aho et al., "Data Structures and Algorithms", Jun. 1983, pp. 60-65, 122-151, Addison-Wesley Publishing Company.
K. K. Sy et al., "OSI-SNA Interconnections", 1987, pp. 157-172, IBM Systems Journal, vol. 26, No. 2.

Primary Examiner—Douglas W. Olms
Assistant Examiner—Alpus H. Hsu
Attorney, Agent, or Firm—Andrew J. Dillon; Kenneth C. Hill

[57] ABSTRACT

A system and method for use with communications systems is used as an interface between different communications architectures. Control blocks are used to store information pertaining to individual communications sessions, or links. Communication link identifiers are different for the two different communications architectures. The interface provides an efficient technique for bidirectionally translating such link identifiers. Identifiers from routines implementing each architecture are used to generate pointers to the appropriate control blocks for each communications session. These control blocks are then used by routines interfacing to the other architecture to extract the translated identifiers.

7 Claims, 3 Drawing Sheets

COMMUNICATIONS ARCHITECTURE INTERFACE

BACKGROUND OF THE INVENTION

1. Technical Field:

The present invention relates generally to computer system communications, and more specifically to a system for performing translations between communications procedures which use non-conforming interfaces.

2. Background Art:

Communications between two or more different computer systems usually involve the use of a serial communications link. Many different system and network architectures are in widespread use for performing inter-system serial communications. These architectures often use different, and incompatible, hardware, signaling techniques, data packet handling, and other features. Application programs executing on one system cannot, in general, communicate with applications executing on another system unless both systems support a common link architecture.

One reference model for communications standards is the Open Systems Interconnection (OSI) reference model, promulgated by the International Organization for Standardization. This model provides a seven layer structure. Ideally, each layer is independent, and communicates only with the layers directly above and below it. Actual implementations vary in the degree of success with which they make each layer independent.

The bottom layer of the OSI model is the physical layer, layer one. This layer defines the physical hardware and its interconnections. The second layer is the data link control layer, which performs error checking on transmitted packets and provides flow control.

The third layer is the network layer, which routes data through one or more networks and maintains network connections. Layer four is the transport layer, which ensures that all data packets are delivered correctly.

Layers five through seven comprise the session layer, presentation layer, and application layer, respectively. These higher levels provide functions needed by application programs to establish communications sessions between two systems and to manipulate transferred data.

Another well known communications architecture is Systems Network Architecture (SNA), which is available from IBM and widely supported. SNA has a structure which is similar to the OSI seven layer model. However, the layers, from an interface perspective, do not correspond. This means it is not possible for a SNA layer to communicate with an OSI layer.

It is not uncommon for a computer system to execute software implementing one communications architecture, but be required to connect to a network which uses a different communications architecture. In order to allow an application intended for communication using one architecture to function with a network based on another, it is possible to rewrite the software for the new architecture. This is a very time consuming and expensive task. In many installations, it is not possible or desirable to either rewrite software to allow it to function with a different communications architecture, or to change to a new software package intended for use with the other architecture and which may perform differently from the original package.

It is desirable, if possible, to have the communications architecture utilized on a network to be transparent to high level applications, and to allow such applications to function unmodified regardless of the underlying network type. It would be desirable to provide a system which allows existing applications to interface transparently with those which perform in accordance with a different communications architecture.

SUMMARY OF THE INVENTION

It is therefore an object of the present invention to provide a system and method for interfacing communications software routines which utilize different communications architectures.

It is a further object of the present invention to provide such a system and method which provide an interface between higher level layers which use a first communications architecture and lower level layers which use a second architecture.

It is another object of the present invention to provide such a system and method which performs the necessary translations in an efficient manner.

Therefore, according to the present invention, a system and method for use with communications systems is used as an interface between different communications architectures. Control blocks are used to store information pertaining to individual communications sessions, or links. Communication link identifiers are different for the two different communications architectures. The interface provides an efficient technique for bidirectionally translating such link identifiers. Identifiers from routines implementing each architecture are used to generate pointers to the appropriate control blocks for each communications session. These control blocks are then used by routines interfacing to the other architecture to extract the translated identifiers.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
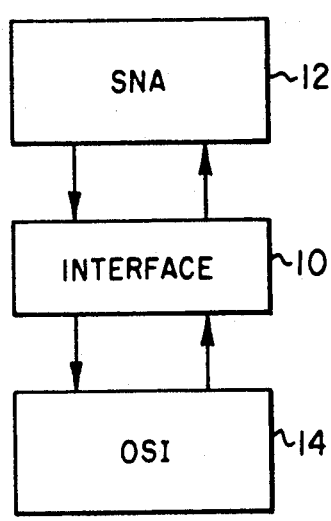
FIG. 1 is a block diagram illustrating the location of an interface between communications systems utilizing two different architectures.

Referring to FIG. 1, an interface 10 is used to provide communications between parts of communications systems 12, 14, which implement different communications architectures. System 12 preferably includes the higher order layers of an SNA communication system, with system 14 including the lower layers of an OSI architected system. A physical communications link with other computer systems is made by the OSI section 14, and user application interfacing is performed by the SNA system 12. The interface 10 resides between them, and allows a low layer of SNA system 12 to communicate with a corresponding layer of OSI system 14

Figure 2:
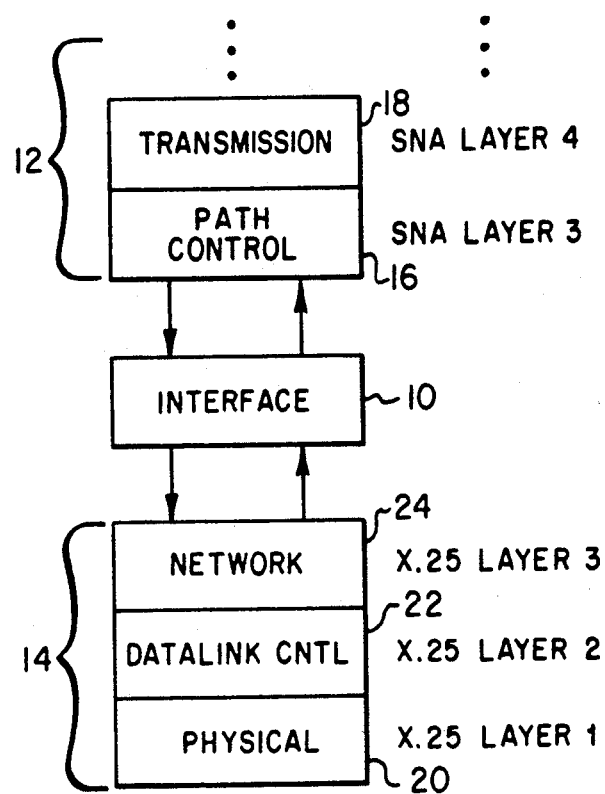
FIG. 2 is a more detailed block diagram showing positioning of the interface in a preferred embodiment.

Referring to FIG. 2, the interface 10 is positioned to communicate with the SNA path control layer 16. Path control layer 16 is layer three in the SNA communications model. SNA path control layer 16 also communicates with transmission layer 18, which in turn communicates with the higher SNA layers (not shown).

As known in the art, layers one, two, and three of the OSI model are embodied in a communication standard known as X.25. The three layers embodied in OSI system 14 are the physical layer 20, data link control layer 22, and network layer 24. Interface 10 communicates directly with network layer 24.

In operation, information to be transmitted by an application program to another system is passed to the transmission layer 18 from higher SNA layers. The passed information can include data or control information. Transmission layer 18 in turn passes the information to SNA path control layer 16 which passes it to the interface 10. Interface 10 performs a translation of certain information, set forth in more detail below, and passes information along to X.25 network layer 24. Network layer 24 in turn passes the information to data link control layer 22, which controls transfer of the information to the other computer system through the hardware layer 20.

Data received from a remote system is transferred in a similar manner, but in reverse order. Incoming information is received by the hardware layer 20 and passed to data link control layer 22. The information then passes through network layer 24 to the interface 10, where selected information is translated to the form required by SNA path control layer 16. The information is then passed to path control layer 16, and then routed through the various SNA layers.

Most of the various communications layers are implemented in software on a general purpose digital computer system. In the illustrative embodiment, SNA layers 18, 16, and those not shown are implemented in software. Interface 10 is a software interface, and X.25 network layer 24 is implemented in software. Data link control layer 22 is generally implemented in software, but may be implemented in firmware or hardware if desired. Physical layer 20 is a hardware layer. As is known in the art, the various layers transmit information to adjacent layers via procedure calls, interrupts, or other interprocess communication mechanisms.

Figure 3:
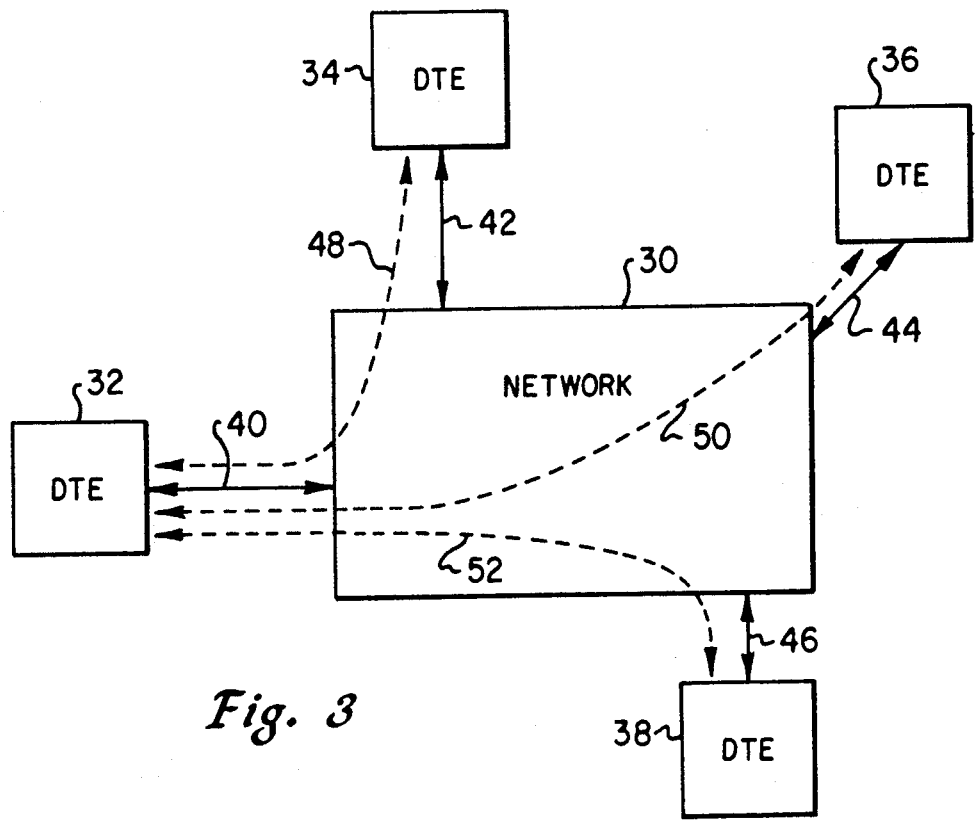
FIG. 3 is a block diagram of a network indicating physical and logical communications links.

FIG. 3 is a high level diagram of a network which illustrates principles necessary to understanding the present invention. A network, represented generally by reference numeral 30 includes physical interconnections between machines and any necessary network controllers and switches. Computer systems 32, 34, 36, 38 are physically connected to the network 30. Systems so attached to the network 30 are often referred to as data terminal equipment (DTE). System 32 is connected to the network through physical link 40. Physical link 40 represents the actual wires which are used to connect system 32 with its adjacent node within the network 30. Similarly, physical links 42, 44, and 46 represent the wires used to connect systems 34, 36, and 38, respectively, to other nodes within the network 30. Although only one physical link is shown for each system in FIG. 3, the systems are not limited to only one physical link to the network 30. In addition, other physical links may be used to connect one or more of the systems 32–38 to a separate independent network (not shown).

When a communications session is set up between two systems, a logical link is established between them. These logical links are also referred to as logical connections and virtual circuits. A logical link is a communications link established between two systems regardless of the identity or number of intervening nodes within the network 30.

The dashed lines in FIG. 3 indicate three different logical links. Logical link 48 connects systems 32 and 34. In a similar manner, logical link 50 connects systems 32 and 36, while logical link 52 connects systems 32 and 38. Multiple logical links can be established over a single physical link, as is illustrated with logical links 48, 50, 52 all operating over a single physical link 40. The maximum number of logical links which can be operated simultaneously over a single physical link is dependent upon individual system design, and has a maximum value limited by the bandwidth of the physical link and the communications rates of the various logical links. A finite upper bound can be imposed by network constraints.

The identification of physical and logical links is handled differently by SMA path control layer 16 and X.25 network layer 24, and the function of interface 10 is to translate these identifiers so that they can be understood by each layer. Since a single system can be communicating simultaneously on a large number of physical and logical links, each information packet which is transmitted or received by a system must properly identify these links. Outgoing information must be routed correctly, and incoming information must be assembled correctly and the physical and logical link identifiers provide the information necessary to accomplish this.

Both the physical and logical link identifiers used by the SNA architecture are incompatible with those used by X.25. Under both architectures, each physical link and each logical link has a unique identifier, so that there is a one-to-one correspondence between the SNA identifiers and the X.25 identifiers. However, the relationship between identifiers is arbitrary, so that no simple mapping function exists. As will be appreciated by those skilled in the art, this mapping function, which can also be referred to as identifier name translation, must be performed efficiently. If the time taken to perform the translation becomes too long, the effective communications rate of the system will decrease.

Figure 4:
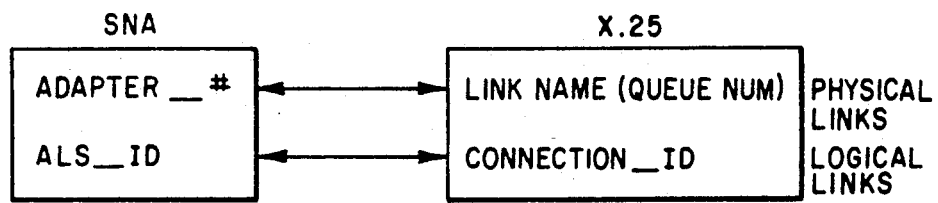
FIG. 4 illustrates identification information which must be translated by the interface.

As shown in FIG. 4, the physical link identified is referred to in one implementation of the SNA architecture as an ADAPTER_#. The ADAPTER_# is an integer value. In one implementation of X.25, the corresponding physical link identifier is referred to as a LINK NAME, which is a character string of up to eight bytes in length. Various implementations of SNA and X.25 refer to the physical link identifier with different names, such as port number, port address, and link id. The ADAPTER_# is passed to interface 10 by the SNA network layer 16, and must be translated to the corresponding LINK NAME to be passed to the X.25 network layer 24. When information is received by the system, the X.25 network layer 24 passes a LINK NAME to the interface 10, which must be translated to the corresponding ADAPTER_# for transmission to the SNA network layer 16. When the X.25 network layer 24 passes the LINK NAME to the interface 10, some type of identifier bound to the LINK NAME is also passed. In one implementation, this identifier can be used to refer to the queue which holds information packet.

The logical link identifier in the SNA architecture is referred to as an ALS_ID (Adjacent Link Station), which, in one implementation, is a twelve byte identifier. In one implementation of the network layer 24 om X.25, the logical link identifier is referred to as a CONNECTION_ID, which is a four byte identifier. These values are assigned arbitrarily, and the SNA and X.25 identifiers are non-conforming.

Figure 5:
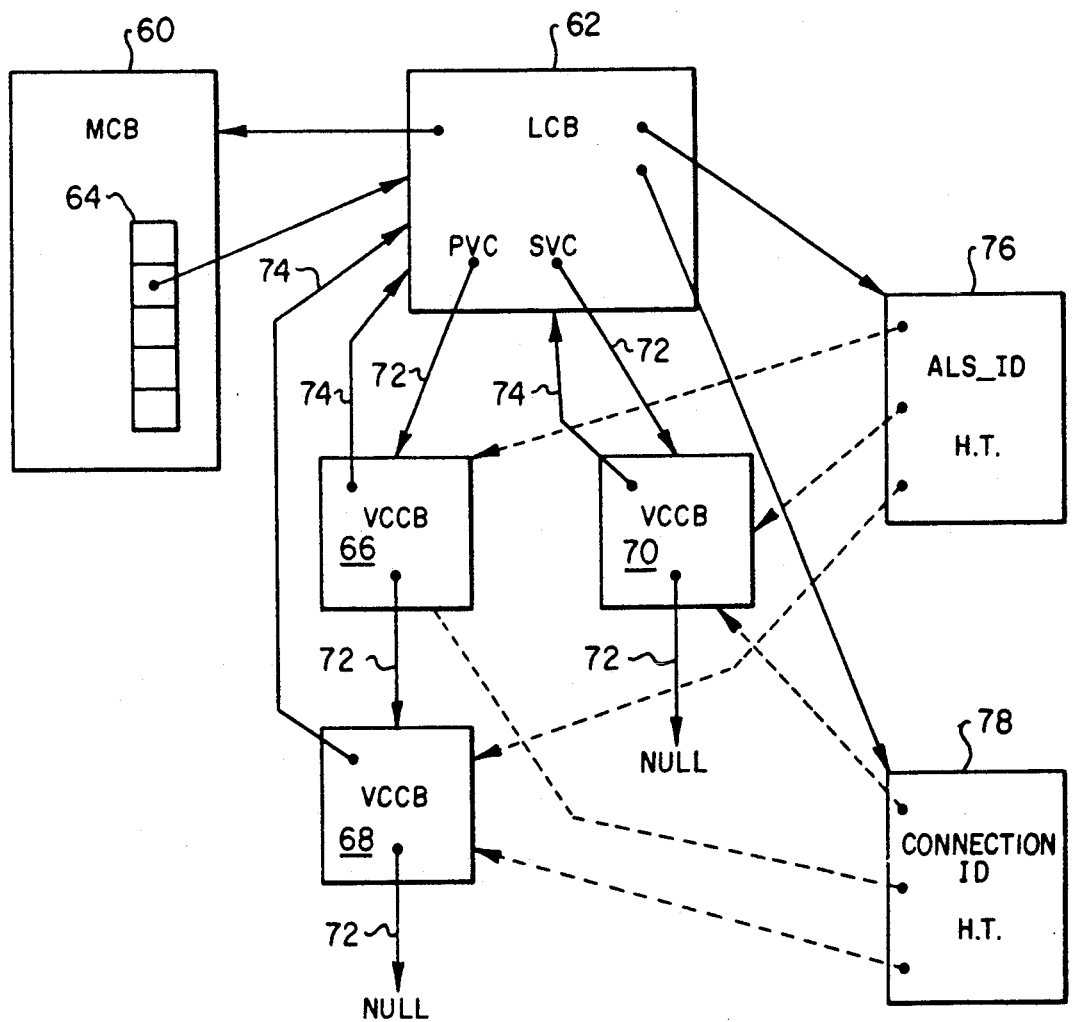
FIG. 5 is a block diagram illustrating data structures used by a preferred interface.

Referring to FIG. 5, a data structure used by the preferred embodiment for performing translation of the physical and logical link identifiers is shown. This data structure is contained in the interface 10 and accessed by its routines. A master control block 60 (MCB) is a static data object, and contains information which is used globally by the interface 10. Each active physical link connected to the system has a link control block 62 (LCB) which contains all information which is relevant to that particular physical link but not to any other physical links. Only one LCB 62 is shown in FIG. 5, corresponding to a system having only a single physical link to a network.

The MCB 60 contains an array 64 of pointers to the various active LCBs 62. Each entry in the array 64 corresponds to one possible physical link which can be connected to the system. Only pointers to LCBs which actually exist in the system are contained in the array 64. Each LCB 62 has a back pointer to the MCB 60.

As described above, each physical link may contain multiple logical links, also known as virtual circuits. Each virtual circuit has an associated control block which contains all information needed by both the SNA path control layer 16 and the X.25 network layer 24 to handle communications transactions over that link. FIG. 5 shows three such controls blocks 66, 68, 70, which are referred to as virtual circuit control blocks (VCCB). Each active virtual circuit over a single link has a VCCB which is linked by pointers to the LCB 62 for that physical link.

For efficiency reasons, virtual circuits are classified as being one of two types. These types are permanent virtual circuits (PVC) and switched virtual circuits (SVC). Permanent virtual circuits are permanent logical links between two systems on a network, while switched virtual circuits are temporary. Use of permanent virtual circuits guarantees that a logical link will always exist between two selected systems on a network, but wastes network resources when the link is not actually being used. Switched and permanent virtual circuits are grouped separately within the LCB in order that certain procedures, not relevant to the present invention, may be performed more efficiently.

All of the VCCBs related to a particular LCB 62 are placed in one of two linked lists anchored in the LCB 62. One list is for the permanent virtual circuits, with the other being for the switched virtual circuits. Each VCCB 66, 68, 70 contains, in addition to a pointer to the next item in the list, a back pointer to its associated LCB 62. In FIG. 5, linked list pointers are identified as reference number 72, with the back pointers being identified as reference number 74.

LCB 62 also contains pointers to two hash tables 76 and 78. Table 76 is an ALS_ID hash table, and table 78 is a CONNECTION_ID hash table. Each valid entry in both has tables 76, 78 contains a pointer to one VCCB (dashed lines). Each hash table 76, 78 must have at least as many entries as the maximum number of logical links which can be handled simultaneously over the physical link represented by LCB 62.

Figure 6:
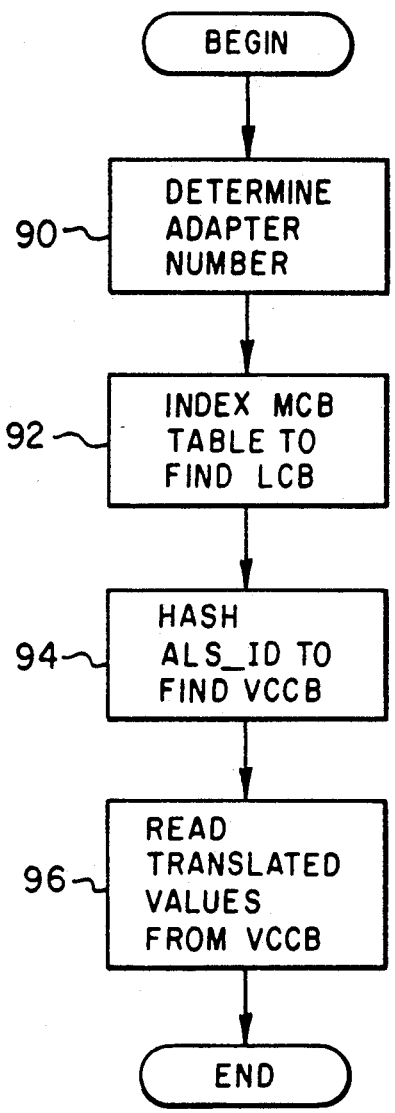
FIGS. 6 and 7 are flow charts illustrating operation of a preferred interface according to the present invention.

FIG. 6 illustrates the method by which the interface 10 uses the data structure shown in FIG. 5 to translate SNA physical and logical link identifiers to the corresponding X.25 identifiers. First, the adapter number is determined 90. This value is passed to the interface 10 by the SNA network layer 16 as the value ADAPTER_#. The adapter number is then used directly as an index into array 64 to obtain a pointer to the corresponding LCB 92. The ALS_ID provided by SNA network layer 16 is then hashed 92 to obtain an index into hash table 76. The corresponding entry in hash table 76 contains a pointer to the VCCB for that logical circuit. The LINK NAME and CONNECTION_ID are read directly from the VCCB 96 for transfer to the X.25 network layer 24.

Figure 7:
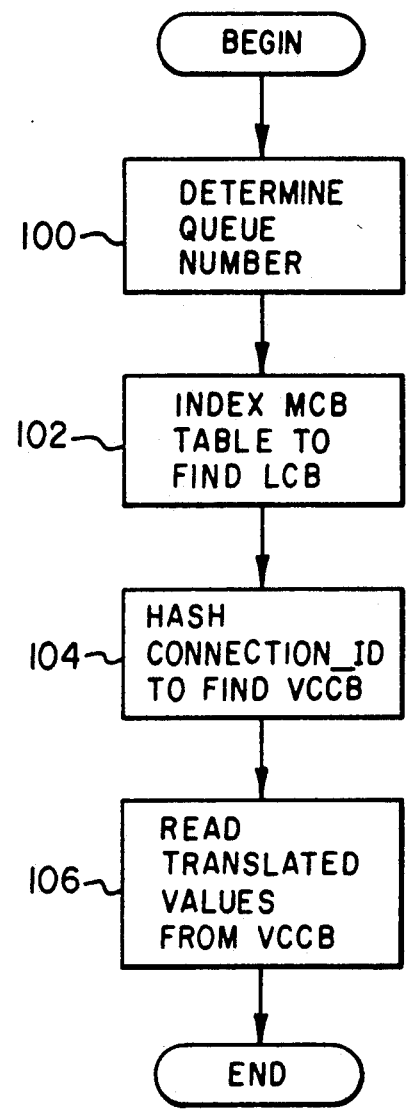

FIG. 7 illustrates the steps which are used to translate identifiers provided by the example X.25 network layer 24 described above into identifiers usable by the example SNA path control layer 16 described above. When the network layer 24 transfers a LINK NAME to the interface 10, the identifier (queue number) from which the information was obtained is also passed to the interface 10, allowing it to determine the queue number 100. Preferably, the queue numbers for each physical link are numbered so as to correspond with the ADAPTER_# used by SNA. This allows the array 64 in FIG. 5 to be indexed directly using the queue number to obtain a pointer to the LCB 62 corresponding to the physical link 102. If the queue numbers are not so allocated, a second array (not shown) can be included in the MCB 60 which contains LCB 62 pointers and which can be directly indexed by the queue numbers.

Once the appropriate LCB has been found, the CONNECTION_ID passed to the interface 10 by the X.25 network layer 24 is hashed 104 into an index to locate the appropriate entry in the hash table 78. As before, hash table 78 contains a pointer to the VCCB associated with the CONNECTION_ID logical link. The SNA ADAPTER_# and ALS_ID are then read directly from the VCCB 106, and made available to the SNA network layer 16.

The precise hashing algorithm used to generate entries to the hash tables 76, 78, can be chosen to suit the implementor. Since the ALS_ID and CONNECTION_ID have significantly different sizes, different algorithms may be used for hashing these identifiers to provide greater efficiency.

The data objects described in connection with FIG. 5 are interconnected by pointers so that they may be dynamically allocated and deallocated. MCB 60 is a static object which is always available to the interface 10. However, it is relatively small. Link control blocks 62 are only allocated for so many physical links as are actually established (active). Hash tables 76, 78 are allocated when their associated LCB 62 is allocated. As each logical link is established, a corresponding VCCB is created and linked to the appropriate LCB 62. As logical links are closed, the associated VCCB is deallocated. Similarly, as physical links are closed, the associated LCBs and hash tables are deallocated.

As will be appreciated by those skilled in the art, the mapping of physical and logical link identifiers using the system and method described above is very efficient. Only a small number of steps must be performed in order to obtain the corresponding identifier values.

The single most complex step of the translation process is the hashing step, which must be performed once for each translation. Numerous efficient hashing techniques are known in the art, and selection of a technique appropriate to the remainder of the system is easily accomplished by those skilled in the art.

The translation technique described herein has been illustrated with reference to physical and logical link identifier translation between SNA systems and OSI systems, specifically the X.25 architecture. However, it will be apparent to those skilled in the art that the same techniques may be applied to other translation systems where there exists a one-to-one mapping of arbitrarily related identifiers. The system and method described herein are efficient in terms of both execution time and memory space required. This makes the disclosed system and method suitable for use on a wide variety of systems wherein the described translation technique may be required.

While the invention has been particularly shown and described with reference to a preferred embodiment, it will be understood by those skilled in the art that various changes in form and detail may be made therein without departing from the spirit and scope of the invention.

We claim:

1. A method for, within a computer system, selecting information data blocks for use with bidirectional information transfers, comprising the steps of:
   for information transferred in either direction, selecting a control block corresponding to a physical link on which an information transfer occurs;
   for information transferred in a first direction, over a logical link associated with the physical link, using a first translation table associated with the selected control block to identify a first information data block from a first logical link identifier;
   for information transferred in a second direction, over the logical link, using a second translation table associated with the selected control block to identify a second information data block from a second logical link identifier;
   for information transferred in the first direction, selecting the first information data block to control data transfer; and
   for information transferred in the second direction, selecting the second information data block to control data transfer.

2. The method of claim 1, wherein said step of selecting a control block comprises the step of:
   accessing an array of pointers to control blocks using a physical link identifier as an index; and
   selecting the control block pointed to by the pointer so indexed.

3. The method of claim 2, wherein information transferred in the first direction and information transferred in the second direction have different identifiers referring to the same physical link, and wherein both identifiers are used to access an array of pointers to obtain pointers to the same control block.

4. The method of claim 1, wherein the first and second translation tables are hash tables containing pointers to information data blocks, wherein the first and second logical link identifiers are hashed to generate indexes into the first and second hash tables, respectively, and wherein pointers to the information data blocks are contained in the first and second hash tables at locations corresponding to the first and second hashed indexes, respectively.

5. A system for selecting a control block corresponding to a bidirectional communication link, comprising:
   a plurality of logical link control blocks, each corresponding to a single logical link;
   a plurality of physical communications connections to the system;
   a physical link control block corresponding to each of said physical communications connections;
   first and second translation tables connected to each physical link control block and containing pointers to logical link control blocks for all logical links which use that physical link;
   a master control block containing pointers to all of said physical link control blocks;
   means for selecting a pointer to a physical link control block from said master control block using a physical link identifier; and
   means for selecting a logical link control block pointed to be a pointer in said first or second translation table using a first or second logical link identifier, respectively.

6. The system of claim 5, wherein said first and second translation tables comprise hash tables, and wherein said logical link control block selection means comprises software which functions by performing the following steps:
   for information transmission in a first direction, hashing the first logical link identifier to generate an index into said first hash table;
   for information transmission in a second direction, hashing the second logical link identifier to generate an index into said second hash table; and
   selecting logical link control block pointed to by a pointer corresponding to the generated hash table index.

7. The system of claim 5, wherein said means for selecting a logical link control block comprises:
   means for hashing the first logical link identifier to generate a first index when information transmission occurs in a first direction;
   means for hashing the second logical link identifier to generate a second index when information transmission occurs in a second direction; and
   means for identifying a logical link control block pointed to be a pointer, in said first or second translation table, indexed by the first or second index, respectively, such identified control block defining the selected control block.

* * * * *